May 11, 1937.  G. E. THOMAS  2,079,699

FLUID INDICATOR

Filed Aug. 21, 1934

INVENTOR.
GEORGE E. THOMAS.
BY
H. A. Druckman
ATTORNEY.

Patented May 11, 1937

2,079,699

UNITED STATES PATENT OFFICE 2,079,699

FLUID INDICATOR

George E. Thomas, Long Beach, Calif.

Application August 21, 1934, Serial No. 740,779

1 Claim. (Cl. 73—82)

This invention relates to a fluid indicator for containers whereby the varying level of the fluid in the container actuates a calibrated plate, and the image of this plate is transmitted to a remote point and is there visible to an operator.

An object of my invention is to provide a novel and simple fluid indicator the indicating portion of which is so arranged that the image thereof is transmitted to a remote point and is visible to the operator.

Another object is to provide a fluid indicator for the crank case of engines or the like which is simple in construction and inexpensive to manufacture and which includes a light bulb for the purpose of transmitting the image of the indicating card or plate to a point on the dash or within the cab of the vehicle.

Still another object is to provide a fluid indicator of the character stated which can be attached to engines, gas tanks, or the like, of vehicles now in common use.

Other objects, advantages and features of invention may appear from the accompanying drawing, the subjoined detailed description and the appended claim.

In the drawing

Figure 1:
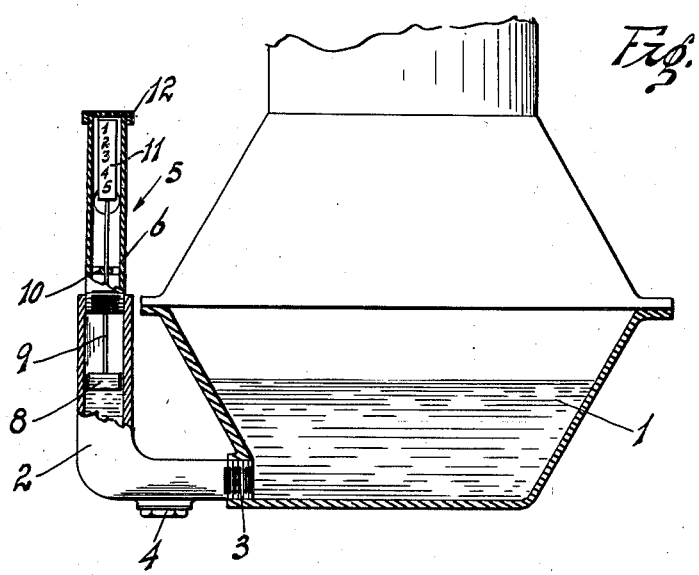
Figure 1 is a fragmentary sectional view of my indicator in position upon a crank case of an engine.
Figure 2:
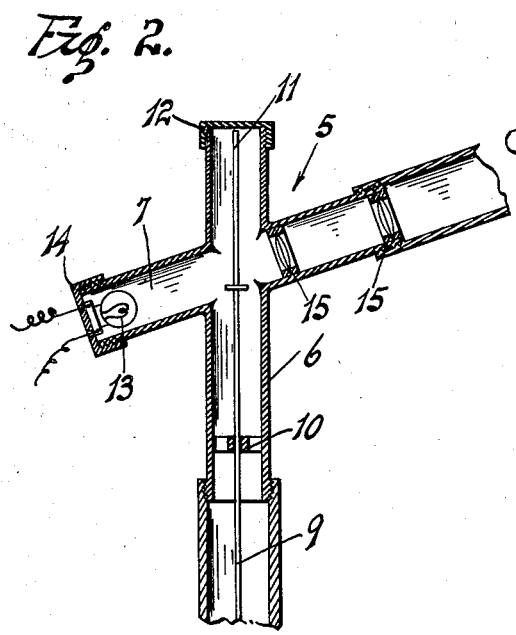
Figure 2 is a side elevation partly in vertical section of my indicator.
Figure 3:
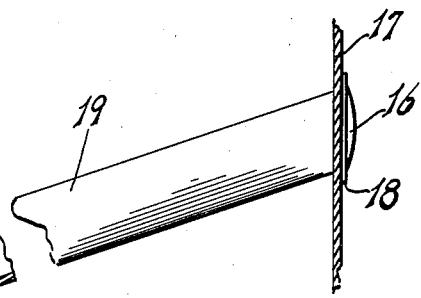
Figure 3 is a front elevation of the screen or glass upon which the image of the indicating element is projected.

While I have shown the preferred embodiment, other forms may be devised within the scope of the claim appended hereto, and I desire in this specification to include all those forms included within the scope of the claim.

Referring more particularly to the drawing, the numeral 1 indicates a fluid container such as the crank case of an internal combustion engine. A float chamber 2 substantially L shaped screws into the container 1 as shown at 3. A drain plug 4 is provided in the horizontal arm of the float chamber 2 for the purpose of draining the fluid from the crank case 1 when necessary.

A fitting 5 is mounted on the vertical arm of the float chamber 2 and consists of a vertical tube 6 and a substantially horizontal tube 7 which intersects the tube 6. The tubes 6 and 7 are preferably one integral part. The tube 6 screws into or is otherwise attached to the float chamber 2.

A float 8 is positioned within the chamber 2 and a rod 9 rises from the float 8 into the tube 6. The rod is held in a central position in the tube 6 by means of a guide 10. The plate 11 is provided on top of the rod 9, and this plate may if desired be an integral part of the rod 9 and may be formed by flattening the upper portion of the rod.

Figures or other indicia are cut in the plate 11, and these figures correspond to and indicate the capacity of the crank case or container 1. The cap 12 screws onto the top of the tube 6. As previously stated, the tube 7 intersects the tube 6. A light bulb 13 is positioned within the tube 7, and suitable electric wires extend to this bulb to light the same whenever desired.

A cap 14 is screwed onto the end of the tube 7 and may carry the bulb 13 if desired. One or more focusing lenses 15—15 are mounted in the tube 7 on the opposite side of the plate 11 from the bulb 13; thus the light from the bulb 13 must first shine through the plate 11 or through figures cut therein, and then passes through the focusing lenses 15.

A screen 16 is mounted on the dash 17 or other suitable point in the cab of the vehicle or the like. This screen may if desired consist of a ground glass disk which is mounted in an annulus 18. If it is desired, a pipe 19 may extend from the tube 7 to the screen 16. However, the image of the figures on the plate 11 will be transferred to the screen without the pipe, and under certain conditions the pipe can be safely eliminated.

The float 8 rises and falls with the level of the liquid in the container 1, and as the float rises and falls, the figures on the plate 11 will be moved over the tube 7. The light from the bulb 13 will illuminate the figures in the plate or will shine through these figures if said figures are cut in the plate.

The lenses 15 will then focus the rays from the bulb 13 upon the screen 16 so that the operator can always ascertain the level of the fluid in the container.

Having described my invention, I claim:

A liquid level indicator comprising a float chamber adapted to be placed in communication with the liquid the level of which is to be measured, a fitting mounted on the float chamber, said fitting comprising a vertical tube, and a substantially horizontal tube intersecting the vertical tube and integrally formed therewith, a float in said chamber, a transparent indicating plate carried by the float and adapted to move vertically with movement of said float, said indicating plate extending into the vertical tube, a light bulb in the horizontal tube, a focusing lens in said horizontal tube, said light and lens being arranged on opposite sides of the indicating plate and a remote screen upon which the lens directly focuses the image of the indicating plate.

GEORGE E. THOMAS.